July 27, 1965  E. B. PRAY  3,196,727
HYDRAULIC SHEAR
Filed July 10, 1961  5 Sheets-Sheet 3

INVENTOR.
EDWIN B. PRAY
BY
ATTORNEYS

July 27, 1965  E. B. PRAY  3,196,727
HYDRAULIC SHEAR

Filed July 10, 1961 5 Sheets-Sheet 5

FIG_5

FIG_6

INVENTOR.
EDWIN B. PRAY
BY
*Allen and Chromy*
ATTORNEYS

United States Patent Office 3,196,727
Patented July 27, 1965

3,196,727
HYDRAULIC SHEAR
Edwin B. Pray, 345 N. Montgomery St., San Jose, Calif.
Filed July 10, 1961, Ser. No. 122,778
6 Claims. (Cl. 83—601)

This invention relates to hydraulic shears in general, more particularly this invention relates to an hydraulic shear of unitary construction, which may be controlled either manually or automatically.

An object of this invention is to provide an improved shear of unitary construction, which is provided with a built-in hydraulic drive.

Another object of this invention is to provide an improved shear with an hydraulic drive, including an oil containing tank, which forms a support structure on which the shear is mounted.

Still another object of this invention is to provide an improved shear in which the movable shear arm is mounted by means of sealed roller-bearings on the fixed or stationary shear arm.

Still another object of this invention is to provide an improved hydraulic shear mounted on the top wall of the tank, containing hydraulic fluid, and in which the pump and motor drive therefor, are also supported on said top wall of the tank with the motor projecting above said top wall and the pump projecting into the hydraulic fluid in the tank so as to provide a unitary construction.

Other and further objects of this invention will be apparent to those skilled in the art to which it relates, from the following specification, claims and drawings.

In accordance with this invention, there is provided an improved hydraulic shear of a self-contained unitary construction. The basic frame of this shear comprises the hydraulic fluid tank which is provided with a flat top wall to which the shear mechanism that is, the stationary shear-arm is bolted, and which also supports the hydraulic pump and motor drive in such manner that the pump projects down into the tank structure.

The movable shear arm is supported on the stationary shear arm by means of rugged roller bearings which reduce friction to a minimum and also so that the cutting blade of the movable shear arm maintains a precision fit with respect to the cutting blade of the stationary shear arm. Furthermore this bearing structure prevents wear on the shear arm sides where they would otherwise rub against each other during the shearing operation since such rubbing is eliminated.

This shear is also provided with a solenoid operated directional valve which may be controlled by a suitable adjustable trip-mechanism, whereby the movable shear arm may be oscillated automatically by the hydraulic cylinder mechanism. Manual control of the operation of the shear is also provided for and this may be obtained either by using a manually-operable valve, which controls the direction of the fluid to the hydraulic cylinder or it may be obtained by operating a switch such as a foot switch to control the energization of the solenoids of the directional valve. Jogging of the movable shear arm may be obtained by the manual control.

The active portions of the stationary shear arm and the movable shear arm which support the cutting blades are positioned to overhang one of the sides of the tank structure which forms the supporting frame of this shear mechanism so that the active portion of the stationary shear arm may be inserted into the material which is to be sheared if this is convenient. Thus the tank structure of the shear does not obstruct access to the cutting portions of the shear arms.

The tank structure is supported on the floor by means of angle shaped legs which are formed integral with the corner portions of the tank and which are spaced from each other, a sufficient distance, so that the hydraulic shear may be moved about the plant or other locations where it is used, by means of a simple fork lift or similar apparatus simply by engaging the bottom of the tank of the hydraulic shear and transporting the shear as a unit.

Further details of this invention will be set forth in the following specifications, claims and drawings, in which briefly:

FIG. 1 is a perspective view showing an embodiment of this invention which may be set either for automatic operation or for manual operation;

FIG. 5 is a sectional view taken along the line 5—5 of FIG. 2 showing the roller bearings supporting the movable arm of the shear;

FIG. 6 is a detailed view showing the hydraulic pump, directional valve and motor, removed from the tank;

FIG. 8 is a detail plan view of the directional valve mounting plate;

Referring to the drawing in detail, there is illustrated an hydraulic shear employing a base structure which is in the form of a tank 10, as shown in FIG. 1, provided with legs 11, 12, 13 and 14 formed integral therewith at the corners thereof. This tank 10 is adapted to hold a quantity of liquid such as oil, which is adapted to be pumped into the hydraulic cylinder 33 used for actuating the movable shear member 37, as will be described hereinafter.

This shear is constructed such that it may be moved as a unit simply by inserting the lifting members of a fork-type lift between the legs of the shear support and engaging the bottom of the tank structure so that the shear may be lifted by the fork lift and moved as desired.

The wall structure of the tank 10 includes a top 15 which is substantially rigid and to which various parts of this apparatus are attached. This top is provided with a hole over which the plate 16 is positioned and this plate is attached to the top 15 by means of a plurality of bolts 17. A suitable gasket is provided between this plate and the top of the tank. The electric motor 20 is provided with a flange 18 which is attached to the top of the plate 16 by means of bolts 18. This motor is employed for driving a pump 21 shown in FIG. 6 which is positioned inside of the tank and which is also supported from the plate 16, as will be described hereinafter. Suitable loop members 20a are attached to the top of the motor 20 and a suitable lift may be attached to these loop members so that the motor and pump mechanism may be lifted out of the tank 10 if desired for servicing or adjustment. The solenoid actuated valve mechanism 24 shown in FIG. 3, the valve mounting plate 24a shown in FIG. 8 and the valve 23 shown in FIG. 1 are also mounted on the top of the plate 16.

Figure 2:
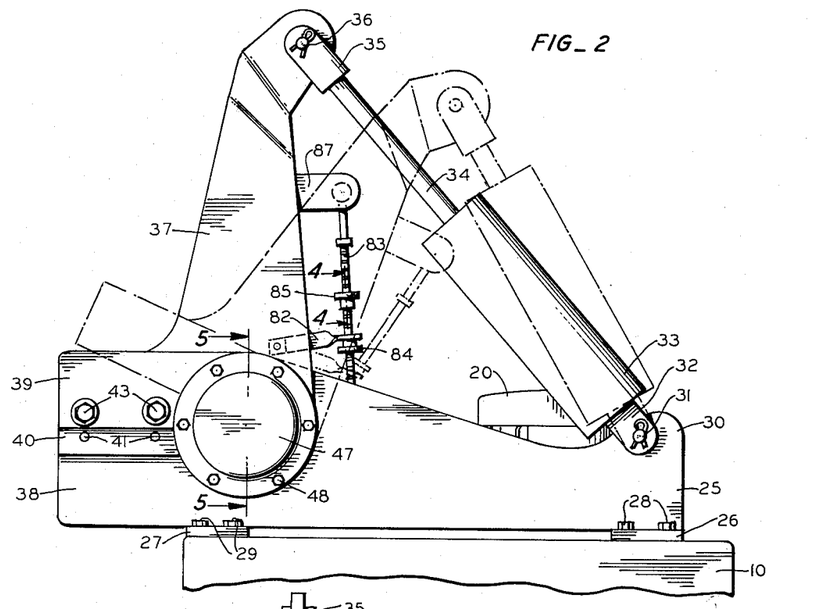
FIG. 2 is a fragmentary side view of the shear of this invention showing the movable shear arm closed in full lines and showing this arm in open position in broken outline.

The bottom shear arm 25 is attached to the top 15 of tank 10, and for this purpose this shear arm is provided with the pads or feed 26 and 27 which are attached to the top 15 by means of the bolts 28 and 29, respectively as shown in FIG. 2. The bottom shear arm 25 is provided with a projection 30 at the top rear portion thereof and a suitable hole is formed in this projection 30 for receiving the pivot pin 31 which acts as a pivot member for the lower end of the hydraulic cylinder 33. The rear end wall of this cylinder 33 is provided with a pair of members 32 which extend to the sides of the projection 30 and which also have a hole formed therein for receiving the pivot pin 31. Thus, the cylinder 33 may be moved with respect to the propection 30 of the bottom shear arm around a pin 31 as a pivot. Suitable plumbing connections 33a and 33b are provided to the front and back of the cylinder 33. An elbow 33c is positioned in the plumbing connection 33d and suitable hydraulic hose lines 75 and 76 are connected to these plumbing connections, as will be described hereinafter.

A suitable piston (not shown) is provided to the cylinder 33, and this piston is connected to the connecting rod 34 which extends out of the front end of the cylinder. A U-shaped connecting member 35 is attached to the outer end of the piston rod 34 and this connecting member is provided with a pivot pin 36 which is positioned in holes formed in member 35 and which is adapted to be positioned in a suitable hole provided in the upper end of the movable shear arm 37. Thus the upper end of this shear arm is pivotally connected to the connecting member 35 of the piston rod 34 by means of the pivot pin 36. Thus by supplying fluid under pressure to the front and back alternately of the cylinder 33, the movable shear arm 37 may be oscillated back and forth with respect to the bottom shear arm 25.

Figures 2A, 5A, 9:
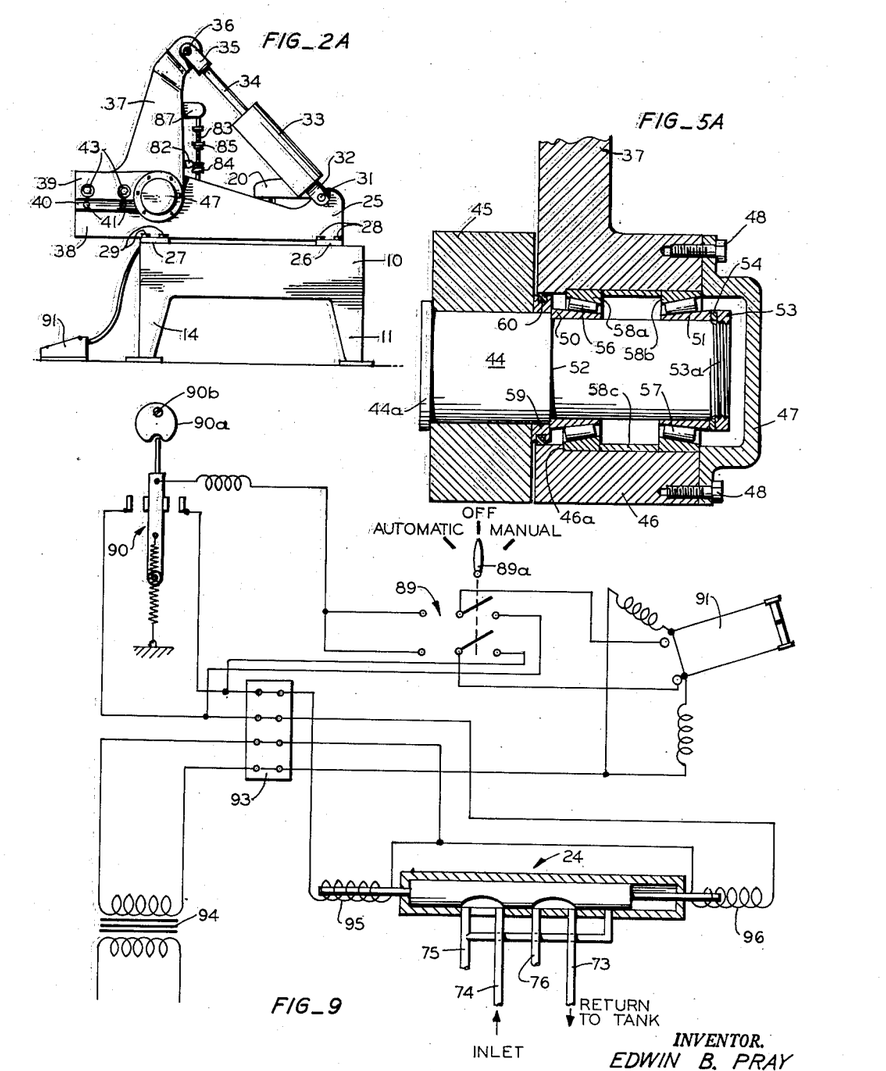
FIG. 2A is a side view showing the cutting portions of the shear arms and illustrating how they overhang the front of the shear support.
FIG. 5A is a view similar to FIG. 5, showing a roller bearing of simplified type employed in smaller shears.
FIG. 9 is a schematic wiring diagram of the electrical connections employed in this apparatus.

The bottom shear arm 25 is provided with a forwardly extending projection 38 which carries the cutting blade 40 and extends beyond the front of the tank as shown in FIG. 2A. The movable shear arm 37 is also provided with a forwardly extending portion 39 which carries the cutting blade 42. This overhanging construction permits use of the shear for cutting metal in frames or box-like structures which would not be accessible to it if the front of the bottom shear arm were even with the front of the tank 10.

Figure 3:
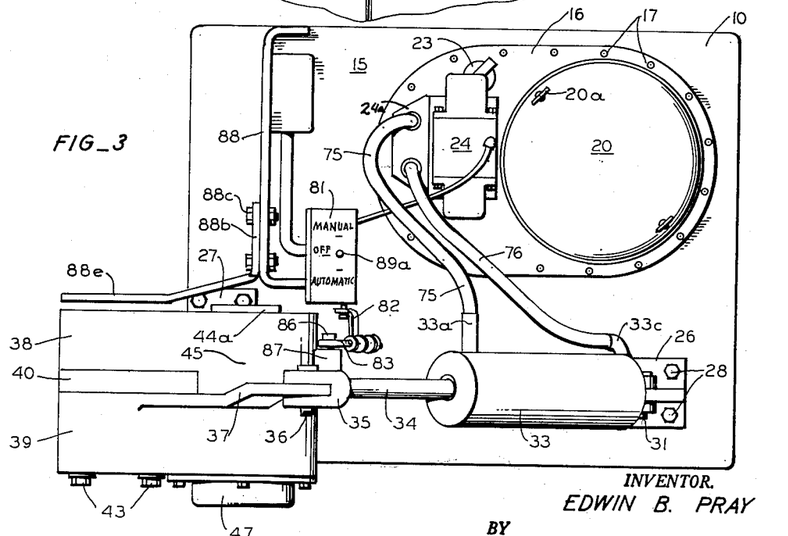
FIG. 3 is a plan view of the hydraulic shear shown in FIG. 1.
Figure 7:
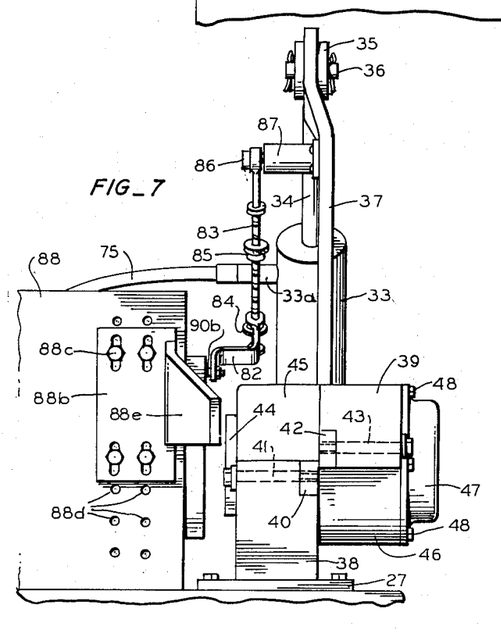
FIG. 7 is an end view showing the stationary shear arm and the movable shear arm from the front thereof.

The bottom shear arm 25 is also provided with an enlarged hub portion 45 for receiving the shaft 44 as shown in FIGS. 3, 5 and 7. This shaft is provided with a shoulder 44a which engages the outer side of the hub 45. Shaft 44 extends into the housing 46 of the movable arm in which the roller bearing assemblies are positioned. A suitable plate 47 which is attached to the housing 46 by means of the bolts 48 is provided for sealing the end of this housing.

In the larger shears, three groups of anti-friction roller bearings are employed as shown in FIG. 5, whereas in the smaller shears, only two such groups are used as shown in FIG. 5A, in which corresponding reference numbers designate corresponding parts. The main roller bearing arrangement shown in FIG. 5 is provided with slightly tapered ring-shaped Timken bearing cones or races 50, 51 which are fitted to the shaft 44 and an outer race 58 which is fitted into the housing 46. The inside end of race 50 abuts the shoulder 52 of the shaft and the outside end of race 51 engages the lock washer 54 which is held on the shaft by the nut 53. The outer surfaces of the races 50 and 51 on which the roller bearings ride are tapered and they are inclined slightly towards each other. A plurality of tapered rollers 56 is positioned on the outer surface of race 50 and a plurality of rollers 57 is positioned on the outer surface of race 51. The ring 58 which is provided with inner tapered or conical surfaces that form outer races for the roller bearings 56 and 57 is positioned inside of the housing 46 and abuts the shoulder 46a formed in this housing. A spacer tube 62 is positioned in housing 46 and the inner end of this tube abuts the outer side of the bearing ring 58. The outer end of the spacer tube 62 abuts the outer race 64 of the auxiliary roller bearing assembly which includes the rollers 63 and inner race or cone 61.

The main roller bearing assembly is held in place on shaft 44 by means of a threaded ring or Timken nut 53 which engages threads 53a formed on the shaft and presses the lock washer 54 against the race 51 of the main bearing assembly. A similar threaded ring or Timken nut 65 engages the threads 65a at the end portion of the shaft 44 and this ring presses the lock washer 66 against the outer end of race 61. Several recesses such as the recess 44b are provided extending under and beyond the cone 61 so that suitable hooks of a tool may be inserted under and behind the cone 61 when it is desired to pull this cone off of the shaft 44. The cap 47 seals the outer end of the housing 46 and is held in place thereon by means of bolts 48 and a packing member or gasket 60 is positioned in the ring 59 which is fitted to the shaft 44 and this gasket 60 functions to seal the other end of the housing 46.

The bearing arrangement shown in FIG. 5 is adapted for use in large hydraulic shears such as will cut iron rods 3 x 3 inches in cross-section, for example, since the end thrust on the shaft 44 is divided between roller bearings 57 and 63 and this bearing assembly is able to stand much greater loads than the assembly shown in FIG. 5A. The bearing shown in FIG. 5A employs only two groups of roller bearings 56 and 57 the outer races 58a and 58b of which are spaced by a sleeve 58c and the outer race 58b is held in place by the cap or plate 47 which abuts the outer end of this race.

In FIG. 6 there is shown a view of a motor 20 and pump 21 assembly removed from the tank. This assembly is supported on the tank by the plate 16 and the pump extends from the bottom of this plate into the tank 10.

The pump 21 which is driven by the electric motor 20 is of conventional construction and may be of the type manufactured by Vickers Inc. Model N1. 2V12D of 23½ gallons a minute capacity, for example. Other pumps may be employed if desired having the required capacity. The pump 21 is provided with an intake pipe 66 which is immersed in the oil or hydraulic fluid contained in the tank 10 and through which this fluid is fed into the pump. An outlet connection 67 is also provided to the pump and this connection is in the form of a T so that it has two outlets, one of which is connected to the relief valve 69, and the other of which is connected to the pipe 68 which extends to the inlet connection 24b of the valve plate 24a on which the directional valve 24, which is of conventional construction, is mounted.

The valve plate 24a is attached to the top of plate 16 by suitable bolts and it is positioned on plate 16 over a hole in the latter plate so that the three threaded holes 24b, 24c and 24d open into the tank 10 whereby the desired connections may be connected thereto. A suitable coupling 68a is threaded into the hole 24b which communicates with the inlet port of the directional valve 24. This directional valve is controlled by a pair of solenoids which operate a pilot valve that controls hydraulic pressure to an auxiliary cylinder and piston arrangement which in turn operates the main directional valve that controls the hyraulic fluid, such as oil, to the cylinder 33. A valve such as valve 24 described above is manufactured by Racine Hydraulic and Machine, Inc. of Racine, Wisconsin, and sold under the name Racine Seco. Other types of valves may be used and if desired the solenoid windings employed in the valve may be used to control the directional valve directly as shown schematically in the diagram of connections FIG. 9.

The relief valve 69 is adjusted to open at a certain predetermined pressure so as to prevent overloading of the shear. Thus if too large a piece of metal is placed between the cutting blades 40 and 42 of the shear, so as to exceed the capacity of the shear, or if an effort is made to employ the shear for cutting metal for which it was not designed, then relief valve 69 will open and prevent the hydraulic fluid from being supplied to the directional valve 24 through the pipe 68 and the operation of the shear is stopped thereby preventing damage thereto.

The directional valve mounting base 24a is also provided with a threaded hole 24c which forms the return line from the valve 24 and is connected to the pipe 68b, shown in FIG. 6. A spring-loaded check valve 68c is provided to this pipe and this check valve may be set at a certain back pressure, for example, 65 lb. to provide for operation of the pilot valve. A suitable filter 68d, such as a micronite filter, is provided to the outlet end of the check valve 68c. Another threaded hole 24d is provided to the base 24a and this hole is connected to the pilot valve discharge pipe 68e. The holes 24e and 24f shown in FIG. 8 extend partially into the plate 24a, and these holes are lined up with the outlet holes of the directional valve 24 so that alternately these holes 24e and 24f form pressure and return. Holes 24e and 24f are connected to the threaded holes 24g and 24h respectively through ducts 24i and 24k respectively formed inside of the base 24a. The lines 75 and 76 shown in FIG. 1 are connected to the threaded holes 24g and 24h respectively, and these lines lead to the ends of the cylinder 33 so that they supply hydraulic pressure to the opposite ends of the cylinder and also form return lines from the cylinder ends as the case may be during the operation of the shear.

There is also provided a spring-loaded valve 23 which is mounted on the plate 16 and which has a tubular connection into the inside of the tank. This valve is spring-loaded so that it is adapted to relieve pressure from the inside of the tank 10, however it does not permit air to enter the tank from the outside. A drain connection 22 is also provided to the bottom of the tank.

This shear is provided with a mechanism whereby it may be operated either automatically or manually through suitable electrical controls which are connected as shown in the diagram of connections illustrated in FIG. 9. The three position switch 89, cam operated toggle switch 90, terminal block 93 and transformer 94 are all positioned in the switch box 81 which is attached to the plate 81a that may be supported by welding or the like along the edge of the plate member 88a which forms one of the sides of the front mounting plate 88. The cam operated switch 90 is provided with an acting cam 90a which is adapted to be rotated by the shaft 90b on which it is supported and which extends outward out of the switch box 81 through a suitable hole. An actuating arm 82 is fixedly attached to the outer end of this shaft as shown in FIG. 7.

Figure 4:
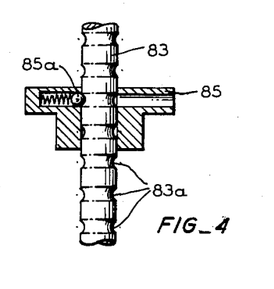
FIG. 4 is a sectional view taken along the line 4—4 of FIG. 2.

Arm 82 is provided with a hole at its free end for receiving the grooved rod 83 which is pivotally mounted by means of the pivot pin 86 and member 87 on the movable shear arm 37 as shown in FIGS. 1 and 7. The grooved rod 83 is provided with a multiplicity of grooves 83a encircling this rod at spaced intervals, as shown in FIG. 4, substantially throughout its length. Actuating members 84 and 85 are provided to the rod 83 for actuating the lever 82. Each of these members is constructed as shown in FIG. 4, with a spring actuated ball 85a which is adapted to be lodged selectively in one of the grooves 83a, whereby these actuating members 84 and 85 may be positioned at different positions on the rod 83 so that the arm 82 of the cam-operated switch 90 may be actuated at different predetermined parts of the stroke of the movable shear arm 37. Thus during automatic operation of the shear, the positions of the members 84 and 85 on the rod 83 determine the length of the stroke of the movable shear arm 37.

The switch 89 which is positioned inside of the switch box 81 is provided with a lever 89a projecting out of the top of this switch box, as shown in FIG. 3. This switch has three positions which are designated "automatic," "off" and "manual." Thus when the switch arm 89a is in its vertical position, the switch is in its "off" position. When the switch is in its "automatic" position, the contactors thereof close the circuit to the left-hand contacts which are connected together to the contactor of the cam-operated switch 90, as shown in the wiring diagram FIG. 9. The contactors of switch 89 are connected by suitable connections to contactors of the foot-operated switch 91 which is provided with a foot pedal that may be tilted by the operator's foot either to the left or right to close the circuit of either the left or right contacts of this switch. The common contacts of foot switch 91 are connected by means of a suitable conductor to one side of the secondary of transformer 94 through the connector block 93 and the other side of this secondary winding is connected through this connector block to the common connection between the solenoids 95 and 96 of the solenoid-operated directional valve 24. The other terminal of solenoid 95 is connected through the connector block 93 to one of the right-hand terminals of the switch 89 and also to the right-hand contact of cam-operated switch 90. The other terminal of solenoid 96 is connected through the terminal block 93 to the other right-hand contact of switch 89 and to the left-hand contact of cam-operated swtich 90.

When this shear is to be operated under manual control the switch lever 89a of switch 89 is placed in the "manual" position in which the right hand contacts thereof are connected to the two upper terminals of the connecting block 93 shown in FIG. 9. With the switch 89 in this position, the energization of the solenoids 95 and 96 of the directional valve 24 is under the control of the foot switch 91. Thus by tilting this foot switch 91 to the right the winding 96 is energized, and by tilting the foot switch to the left, the winding 95 is energized. In this way the directional valve 24 may be shifted back and forth by tilting the foot switch 91 to the right and left. In this operation of the directional valve 24 hydraulic fluid is supplied first, for example, through the pipe 75 to the upper end of the cylinder 33 and exhausted from the lower end of the cylinder through the pipe 76 and then reversing the procedure, hydraulic fluid is supplied under pressure to the lower end of the cylinder to the pipe 75.

During the manual control of the shear, the mechanism for operating the cam 90a which shifts the toggle switch 90 back and forth is not actively employed. However, the stop members 84 and 85 that are positioned on the grooved rod 83 may, during this manual operation, continue to move the arm 82 up and down, except that if the length of the stroke of the movable shear arm is greater than allowed for by the positions of the stop members 84 and 85 on the rod 83, these stop members 84 and 85 may be shifted by the arm 82. For example, if the stop members 84 and 85 are set relatively close together so that they would in the course of automatic operation provide for a rather short stroke of the movable shear arm, and if during manual operation a rather long stroke is desired, then the lever 82 will provide sufficient pressure on either one or both of these stop members 84–85 to shift these members sufficiently to allow for the longer stroke. The spring pressure on the ball 85a in these stop members is light enough to permit the shifting of these stop members during manual operation of the shear.

During manual operation of the shear, the movable shear arm 37 may be moved through very short strokes or partial strokes so that the operator can jog the movable shear arm if he desires. This sort of operation is advantageous where the operator is shearing certain types of scrap metal. Also, this jogging type of operation may be performed at any part of the movable shear arm stroke.

When automatic operation of the shear is desired the lever 89a of switch 89 is shifted to the "automatic" position in which the switch blades thereof contact the left hand contactors shown in FIG. 9. These contactors are connected together to the arm of the toggle switch 90 which is adapted to be oscillated back and forth between its right hand and left hand contacts by means of the cam 90a which is positioned on the member 90b. Member 90b is fixedly attached to the arm 82. Thus as the arm 82 engages the stop members 84 and 85 on the grooved rod 83, the toggle switch 90 is shifted back and forth between its contacts. These contacts are connected to the solenoids 95 and 96 of the directional valve 24 and consequently, as toggle switch 90 is moved back and forth, these solenoids 95 and 96 are energized alternately.

As previously described, the stop members 84 and 85 may be manually set at different positions on the grooved rod 83. Also this grooved rod is moved up and down as the movable shear arm 37 is moved up and down, that is, when hydraulic pressure is supplied to the cylinder 33 and piston rod 34, thereby moving the cutting blade 42, which is attached to the movable shear arm, with respect to the stationary cutting blade 40, which is attached to the stationary shear arm. The bottom stop member 84 may be set so that it actuates the arm or lever 82 of the toggle switch actuating mechanism when the cutting blade 42 of the movable shear arm is closed upon the stationary cutting blade 40 as shown in FIG. 7, or this stop member 84 may be positioned on the grooved rod 83 so that it actuates the arm 82 at some other part of the movable shear arm stroke. The other stop member 85 may be positioned on the grooved rod 83 so that it functions to trip the arm 82 of the toggle switch actuating mechanism when the movable shear arm of the shear is fully open, or this stop member 85 may be set at some lower position on the grooved rod 83 so that it functions to actuate the arm 82 at some position before the movable shear arm is fully open with respect to the stationary shear arm. It is therefore apparent that this shear may be operated automatically through a wide variety of shear strokes ranging from the full shear stroke to a relatively short stroke and also the short stroke may take place at different parts of the full stroke.

The automatic operation of this shear is also controlled by the foot pedal 91. However, in this operation it is immaterial whether this foot switch is closed to the left or to the right. Foot switch 91 is provided with a cable for connecting it to the apparatus in the electrical control box 81 as shown in the wiring diagram FIG. 9 and the foot switch is of course preferably positioned to the front of the shear so that it is accessible to the operator while the operator is standing in front of the cutting ends of the shear arms which extend out over the front of the shear.

A suitable hold-down bracket 88b may be attached to the front of the plate 88 by means of bolts 88c which are adapted to be received by the holes 88d provided in this member 88. The hold-down bracket 88b is provided with a forwardly extending member 88d which is adapted to be positioned near the forwardly extending portion 38 of the stationary shear arm. This hold-down bracket may be adjusted to different positions with respect to the cutting members of the shear so that the forwardly extending part 88e thereof may be positioned to engage the top surface of materials of different sizes fed to the cutting blades of the shear and function to hold down such material during the shearing operation.

Figure 10:
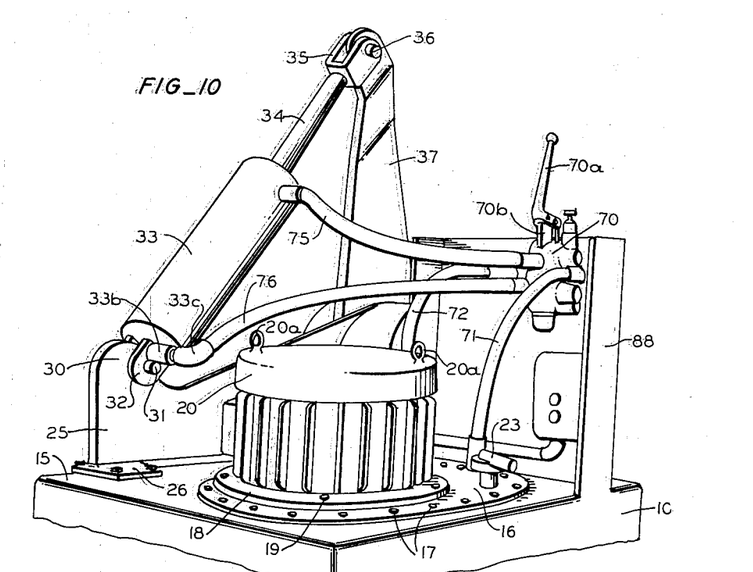
FIG. 10 is a fragmentary perspective view of a hydraulic shear with a manual valve control.

In FIG. 10 there is shown an embodiment of this hydraulic shear that is provided with a manually operable directional valve 70 to control the hydraulic supply of pressure to respective ends of the cylinder 33. Hydraulic pressure is supplied to the valve through pipe 72 and the lower end of this pipe is connected to the pressure line 68 of the pump shown in FIG. 6 which, in this case, is connected directly to the pressure line or pipe 72 inasmuch as the directional valve 24 is not employed in this embodiment of the invention. A return line 71 is provided between the valve 70 and the tank. The lower end of return line 71 passes through the plate 16 and is connected to the pipe 68b shown in FIG. 6. The outlet lines 75 and 76 are connected between the valve 70 and the respective ends of the cylinder 33. Valve 70 is also provided with a manual control lever 70a which is pivotally attached to the housing of the valve and engages the plunger 70b which extends into the valve housing and operates the valve member therein so that hydraulic pressure is alternately supplied to the outlet lines 75 and 76 and alternately these lines are connected to the exhaust line 71. Thus in one instance the line 75 to the top of the cylinder 33 is connected to the pressure line 72 and at the same time the line 76 at the lower end of the cylinder 33 is connected to the return line 71 through the manually controlled valve mechanism 70, and in the next instance the lower line 76 is connected to the pressure line 72 and the line 75 from the upper end of the cylinder is connected to the exhaust 71. Thus by manipulating the lever 70a of the manually controlled valve 70 the movable shear arm of the shear may be caused to oscillate back and forth to perform the desired cutting operation.

While I have shown a preferred embodiment of the invention, it will be understood that the invention is capable of variation and modification from the form shown so that its scope should be limited only by the scope of the claims appended hereto.

What I claim is:

1. In hydraulically operated shears for cutting metal and the like, the combination comprising wall structure forming a tank for receiving the hydraulic fluid for operating the shear, a bottom shear arm, means for attaching said shear arm to the top of said tank, said shear arm having a portion projecting over a side of said tank, a cutting blade attached to said projecting portion, a movable shear arm, a shaft extending through holes formed in said bottom shear arm and in said movable shear arm, antifriction bearing means positioned on said shaft, said bearing means comprising a pair of roller bearing assemblies, each assembly having an inner race and an outer race with a plurality of roller bearings therebetween, said hole in one of said arms being recessed to form a housing for said roller bearing means, said housing having means for clamping said outer races of said roller bearing assemblies to inner surfaces thereof, said movable shear arm also having a portion adapted to project over the side of said tank to cooperate with the projecting portion of said bottom shear arm, a cutting blade attached to the projecting portion of said movable shear arm, hydraulically operable means attached to said movable shear arm for rotating said movable shear arm on said bearing means to bring said cutting blades toward each other in a shearing operation, a pump, a motor for driving said pump, means for mounting said pump and said motor on said tank so that said pump is positioned inside of said tank to receive the hydraulic fluid therefrom, a directional valve having solenoid means for operation thereof, tubular connections between said hydraulically operable means, said directional valve and said pump, control means for said directional valve so that hydraulic pressure may be applied to said hydraulically operable means to open and close said cutting blades of said arms, said control means comprising a reversing switch for controlling the energization of said solenoid means and an adjustable mechanism connected to said movable arm for operating said reversing switch in accordance with the oscillatory movement of said movable arm.

2. In hydraulically operated shears for cutting metal and the like, the combination comprising wall structure forming a tank for receiving the hydraulic fluid for operating the shear, a bottom shear arm, means for attaching said shear arm to the top of said tank, said shear arm having a portion projecting over a side of said tank, a cutting blade attached to said projecting portion, a movable shear arm, a shaft extending through holes formed in said bottom shear arm and in said movable shear arm, roller bearing means positioned on said shaft, said hole in one of said arms being recessed to receive said roller bearing means, said movable shear arm also having a portion adapted to project over the side of said tank to cooperate with the projecting portion of said bottom shear arm, a cutting blade attached to the projecting portion of said movable shear arm to cooperate with said first-mentioned cutting blade in shearing operations, hydraulically operable means attached to said movable shear arm for rotating said movable shear arm on said bearing means to bring said cutting blades toward each other in a shearing operation, a pump, a motor for driving said pump, means for mounting said pump and said motor on said tank so that said pump is positioned inside of said tank to receive the hydraulic fluid therefrom, a directional valve having solenoid means for operation thereof, tubular connections between said hydraulically operable means, said directional valve and said pump, control means for said directional valve so that hydraulic pressure may be applied to said hydraulically operable means to open and close said cutting blades of said arms, said control means comprising a reversing switch for controlling the energization of said solenoid means and an adjustable mechanism connected to said movable arm for operating said reversing switch in accordance with the oscillatory movement of said movable arm.

3. In hydraulically operated shears for cutting metal and the like, the combination comprising wall structure forming a tank for receiving the hydraulic fluid for operating the shear, a bottom shear arm, means for attaching said shear arm to the top of said tank, said shear arm having a portion projecting over a side of said tank, a cutting blade attached to said projecting portion, a movable shear arm, a shaft extending through holes formed in said bottom shear arm and in said movable shear arm, roller bearing means positioned on said shaft, said hole in one of said arms being recessed to receive said roller bearing means, said movable shear arm also having a portion adapted to project over the side of said tank to cooperate with the projecting portion of said bottom shear arm, a cutting blade attached to the projecting portion of said movable shear arm, hydraulically operable means attached to said movable shear arm for rotating said movable shear arm on said bearing means to bring said cutting blades toward each other in a shearing operation, a pump, a motor for driving said pump, means for mounting said pump and said motor on said tank so that said pump is positioned inside of said tank to receive the hydraulic fluid therefrom, a directional valve having solenoid means for operation thereof, tubular connections between said hydraulically operable means, said directional valve and said pump, control means for said directional valve so that hydraulic pressure may be applied to said hydraulically operable means to open and close said cutting blades of said arms, said control means comprising a manually operable reversing switch for controlling said solenoid valve.

4. In hydraulically operated shears for cutting metal and the like, the combination comprising a supporting structure, a bottom shear arm having a cutting blade attached thereto, means for attaching said shear arm to said supporting structure, a movable shear arm also having a cutting blade attached thereto, a shaft extending through holes formed in said bottom shear arm and in said movable shear arm, a pair of opposed roller bearing assemblies each comprising an inner race having an outer surface of frusto-conical shape, an outer race having an inner surface of frusto-conical shape and a plurality of roller bearings engaging said races, means for positioning said inner races on said shaft so that said bearing assemblies are adapted to receive thrust transmitted in opposite directions substantially in the axial direction of the shaft, the thrust in one of said directions being substantially greater than in the other, an auxiliary roller bearing assembly also comprising an inner race having an outer surface of frusto-conical shape, and a plurality of roller bearings engaging said frusto-conical surfaces of said races, means for holding the inner race of said auxiliary bearing assembly on said shaft displaced from said pair of bearing assemblies, said auxiliary bearing assembly being oriented on said shaft to receive part of said greater thrust, the hole in one of said shear arms being recessed to form a housing for said bearing assemblies, and means attached to said movable shear arm for rotating said movable shear arm to bring said cutting blades toward each other in a shearing operation.

5. In hydraulically operated shears for cutting metal and the like, the combination comprising a supporting structure, a bottom shear arm having a cutting blade attached thereto, means for attaching said shear arm to said supporting structure, a movable shear arm also having a cutting blade attached thereto, a shaft extending through holes formed in said bottom shear arm and in said movable shear arm, said shaft having one end portion of smaller diameter than the other end portion, a pair of opposed roller bearing assemblies each comprising an inner race having an outer surface of frusto-conical shape, an outer race having an inner surface of frusto-conical shape and a plurality of roller bearings engaging said races, means for positioning said inner races on said shaft so that said bearing assemblies are adapted to receive thrust transmitted in opposite directions substantially in the axial direction of the shaft, the thrust in one of said directions being substantially greater than in the other, an auxiliary roller bearing assembly also comprising an inner race having an outer surface of frusto-conical shape, an outer race having an inner surface of frusto-conical shape, and a plurality of roller bearings engaging said frusto-conical surfaces of said last mentioned inner and outer races, and means for holding the inner race of said auxiliary bearing assembly on the end portion of said shaft of reduced diameter displaced from said pair of bearing assemblies, said auxiliary bearing assembly being oriented on said shaft to receive part of said greater thrust, said shaft having recesses under said auxiliary bearing assembly to facilitate removal thereof from said shaft, the hole in one of said arms being recessed to form a housing for said bearing assemblies, said housing having means for clamping said outer races of said roller bearing assemblies to inner surfaces thereof, and means attached to said movable shear arm for rotating said movable shear arm to bring said cutting blades toward each other in a shearing operation.

6. In hydraulically operated shears for cutting metal and the like, the combination comprising a supporting structure, a bottom shear arm having a cutting blade attached thereto, means for attaching said shear arm to said supporting structure, a movable shear arm also having a cutting blade attached thereto, a shaft extending through holes formed in said bottom shear arm and in said movable shear arm, a pair of opposed roller bearing assemblies each comprising an inner race having an outer surface of frusto-conical shape, an outer race having an inner surface of frusto-conical shape and a plurality of roller bearings engaging said races, means for positioning said inner races on said shaft so that said bearing assemblies are adapted to receive thrust transmitted in opposite directions substantially in the axial direction of the shaft, the thrust in one of said directions being substantially greater than in the other, an auxiliary roller bearing assembly also comprising an inner race having an outer surface of frusto-conical shape, and outer race having an inner surface of frusto-conical shape, and a plurality of roller bearings engaging said frusto-conical surfaces of said races, and means for holding the inner race of said auxiliary bearing assembly on said shaft displaced from said pair of bearing assemblies and near one end of said shaft, said auxiliary bearing assembly being oriented on said shaft to receive part of said greater thrust, said shaft having recesses cut therein under the inner race of said auxiliary bearing assembly for receiving hook-shaped means for pulling said auxiliary bearing assembly off of said shaft, the hole in one of said arms being recessed to form a housing for said bearing assemblies, said housing having means for clamping said outer races of said roller bearing assemblies to inner surfaces thereof, and means attached to said movable shear arm for rotating said movable shear arm on said bearing means to bring said cutting blades toward each other in a shearing operation.

References Cited by the Examiner

UNITED STATES PATENTS

| | | | |
|---|---|---|---|
| 2,397,603 | 4/46 | Hackett | 83—923 |
| 2,579,750 | 12/51 | Merwin | 83—600 |
| 2,674,942 | 4/54 | Rockstrom | 308—207 |
| 2,678,518 | 5/54 | Honiss | 83—601 X |
| 2,836,473 | 5/58 | Tydeman | 308—207 |
| 2,894,790 | 7/59 | Rudnicki | 308—207 |
| 3,004,458 | 10/61 | Dvorak | 83—601 |

FOREIGN PATENTS

| | | |
|---|---|---|
| 802,360 | 9/36 | France. |
| 1,189,680 | 3/59 | France. |

WILLIAM W. DYER, Jr., *Primary Examiner.*

CARL W. TOMLIN, HUNTER C. BOURNE, ANDREW R. JUHASZ, *Examiners.*